Aug. 15, 1933.　　　　T. E. DREWRY　　　　1,922,796
DIRECTION INDICATOR FOR VEHICLES
Filed Nov. 13, 1931
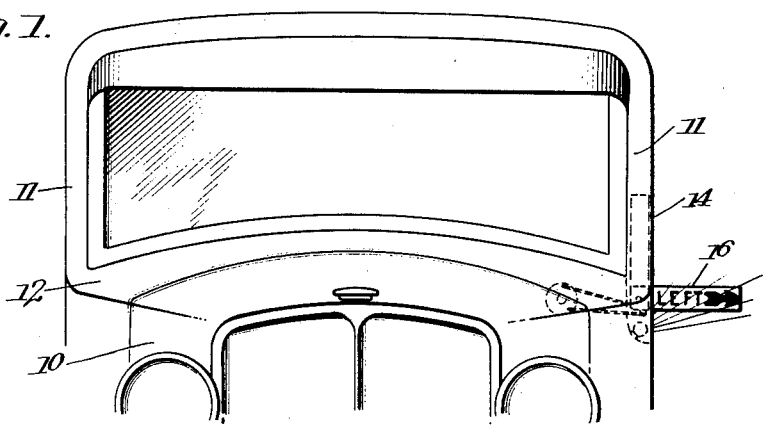
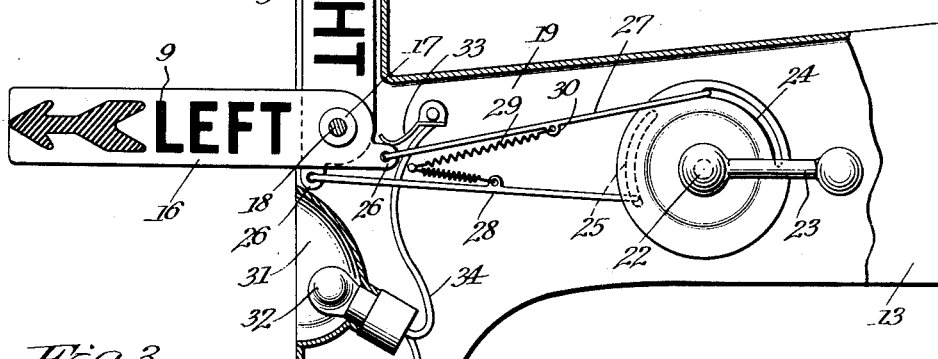
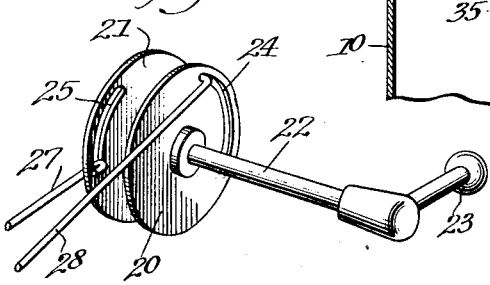
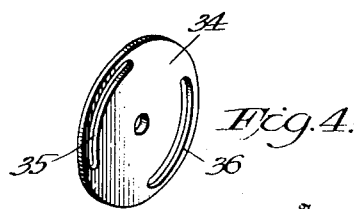
Inventor
T. Ellis Drewry.
By Cushman, Bryant, Darby & Cushman
Attorneys

UNITED STATES PATENT OFFICE 1,922,796

DIRECTION INDICATOR FOR VEHICLES

Thomas Ellis Drewry, Griffin, Ga.

Application November 13, 1931
Serial No. 574,834

3 Claims. (Cl. 116—53)

The present invention relates to improvements in the construction and operation of direction indicators for vehicles.

An important feature of the invention consists in the provision of a simple, efficient, compact, and economical signal apparatus for motor vehicles, which is arranged to be conveniently positioned within the front door post and in the rear of the dash or instrument board of an automobile so as to be manually actuated by the driver to indicate the change in direction of the vehicle to pedestrians and traffic.

A further object comprehends the provision of a substantially L-shaped casing arranged to be associated with a vehicle body and provided with a pair of signal arms that are operatively connected to a revoluble actuating member in such a manner that the arms may be selectively moved independently of each other to signal the change in direction of the vehicle.

Other objects and advantages of the invention will become apparent from the following description when taken in conjunction with the accompanying claims.

Referring to the drawing in which is shown a preferred embodiment of the invention:—

Figure 1 is a front view of a motor vehicle with the invention associated therewith;

Figure 2 is a horizontal sectional enlarged view of the front post and dash showing the signal device mounted therein;

Figure 3 is a detailed perspective view of the revoluble member and operating shaft shown in Figure 2;

Figure 4 is a perspective view of a modified form of the revoluble member which may be substituted for the member shown in Figure 2; and Figure 5 is a detailed sectional view of a modified form of the invention.

Referring to the drawing in which like numerals indicate like parts in the several views, 10 designates a conventional motor vehicle having the front door post 11, cowl 12, and dash or instrument board 13.

The front door post 11 adjacent the steering wheel of the vehicle is preferably formed with an offset portion or casing 14 in which is positioned a pair of signal or indicating arms 15 and 16 that are provided with openings 17 adjacent their lower ends through which extends a shaft or pin 18 so as to movably support the signal arms within the casing 14. The space 19 between the dash or instrument board 13 and the cowl 12 is utilized to constitute the horizontal portion of the signal device casing and has mounted therein a revoluble member in the form of a pair of spaced discs 20 and 21 which are keyed or otherwise non-rotatively secured to a shaft 22 that extends through the dash into the vehicle, at a point adjacent the driver's seat. The shaft 22 has a handle 23 arranged normally to assume a vertical position to permit its convenient operation. The discs 20 and 21 are provided adjacent their peripheries with arcuate slots 24 and 25 positioned in opposed or offset relation to each other and of the same predetermined length. The lower or inner ends of the signal arms 15 and 16 are formed with extending lugs 26 to each of which are connected rods 27 and 28 that in turn are slidably mounted in the arcuate slots 24 and 25 respectively.

The signal arms 15 and 16 have preferably printed or otherwise affixed to both their front and rear faces suitable means 9 for indicating the change in direction of the vehicle to which the device is applied. Suitable tension means such as the springs 29 are each connected at one end to the dash and have their opposite ends secured to lugs 30 extending intermediate the ends of each of the rods 27 and 28 so as to normally maintain the signal arms 15 and 16 in their closed position within the upright or vertical portion 14 of the casing.

Assuming the signal arms are in their inoperative position within the casing, the handle 23 of the shaft 22 is in its normal vertical position so that when turned to the right or clockwise as indicated in Figure 1, it will cause the signal arm 16 to swing to its horizontal position, due to the fact that the rod 27, which is located at the left end of the slot 24, cannot move further relative thereto. The signal arm 15, however, will remain inoperative as the connecting rod 28 is allowed to slide the distance of the slot 24 from its left end to its right end and does not reach the limit of its movement until the arm 16 has moved to its horizontal position. Conversely, when the handle 23 is moved from its vertical position to the left, the arm 15 will be moved outwardly to its horizontal position without causing the actuation of the signal arm 16.

The post 11 below the signal arms may be provided with an offset portion 31 in which is mounted an electric bulb 32 that is connected to switch 33 by the wire 34 and suitably grounded through the wire 35 so as to constitute a part of the lighting system of the automobile. The switch 33 is positioned relative to the lugs 26 of the signal arms 15 and 16 so that when these arms are moved to their horizontal position as shown in Figure 2, the lugs 26 engages the switch 33 to close the circuit, thus causing the bulb 32 to be lit and illuminate the signal.

Referring to Figure 4, there is shown a revoluble member 34 which may be substituted for the member 20 and comprises a single disc which is non-rotatably secured to the shaft 22 so as to be rotated by the actuation of the handle 23 in substantially the same manner as the revoluble member 20. The disc 34 is provided adjacent its periphery with diametrically opposed arcuate slots 35 and 36 arranged to slidably receive the connecting rods 27 and 28 for causing the selective actuation of the signal arms 15 and 16 respectively.

Instead of securing the coiled springs to the connecting rods as shown in Figure 2, they may be secured at their inner ends to the dash such as shown in Figure 5, in which figure the indicating arms 36 are operatively connected to the revoluble actuating member, not shown, by the rods 37 so as to operate in substantially the same manner as the arms 15 and 16 previously described. The arms 36 are yieldably maintained in their vertical position within the housing by the coiled springs 38 which are stationarily connected at their lower ends as at 39 to the dash or instrument board and have their opposite ends each connected to one of the arms 36 as at 40. Otherwise the operation and construction of this form of the invention is substantially similar to that previously described.

While the signal device and its associated parts are shown positioned in the casing formed in the car body, it is to be understood that the signal device may equally be positioned within a substantially L-shaped casing that is associated with the vehicle in any other approved manner. Moreover, the form of the invention illustrated is merely a preferred embodiment and such changes may be made as fall within the purview of one skilled in the art without departing from the spirit of the invention and the scope of the appended claims.

I claim:—

1. A signal device comprising a casing associated with the front door post and dash of a motor vehicle, said casing including a vertical portion and a horizontal portion, a pair of signal arms normally positioned within the vertical portion of the casing and arranged selectively to swing outwardly to a horizontal position, means pivotally supporting the lower ends of said arms in the casing, a revoluble member mounted in the horizontal portion of the casing, said member having opposed arcuate slots and an operating shaft extending axially therefrom and through the dash into the vehicle, a rod connected to one of said arms and slidable in one of said slots, a second rod connected to the other of said arms and slidable in the other of said slots, means normally maintaining said arms in a vertical position within the casing and means on said shaft for rotating said member to selectively move either of the arms to its horizontal position without moving the other arm.

2. A signal device comprising a substantially L-shaped casing formed within the front door post and dash of a vehicle, a pair of signal arms normally mounted within the upright portion of the casing, a common means pivotally supporting the lower ends of the arms in the casing, a revoluble member having spaced discs mounted in the horizontal portion of the casing, said discs provided with arcuate slots adjacent the peripheries thereof and offset relative to each other, an operating shaft extending axially from the revoluble member and through the dash into the vehicle, rods slidably mounted in said slots, one of said rods being connected to one of the signal arms and the other of said rods being connected to the other of said signal arms, means for normally maintaining said arms within the upright portion of the casing, and means in said shaft for actuating the revoluble member to selectively move either of the arms to its horizontal position independently of the other of said arms.

3. A signal indicator for vehicles comprising a substantially L-shaped casing, a pair of signal arms normally positioned within the upright portion of the casing and arranged selectively to swing outwardly to a horizontal position to indicate change in direction of the vehicle, a common means pivotally supporting the signal arms in the casing, a revoluble member journaled in the horizontal portion of the casing and having spaced arcuate slots, rods slidably mounted in said slots, one of said rods connected to one of the signal arms and the other rod connected to the other of said signal arms, means normally maintaining the signal arms in their vertical position within the casing, and means for actuating said revoluble member whereby selectively to move either of the arms to its horizontal position.

T. ELLIS DREWRY.